UNITED STATES PATENT OFFICE.

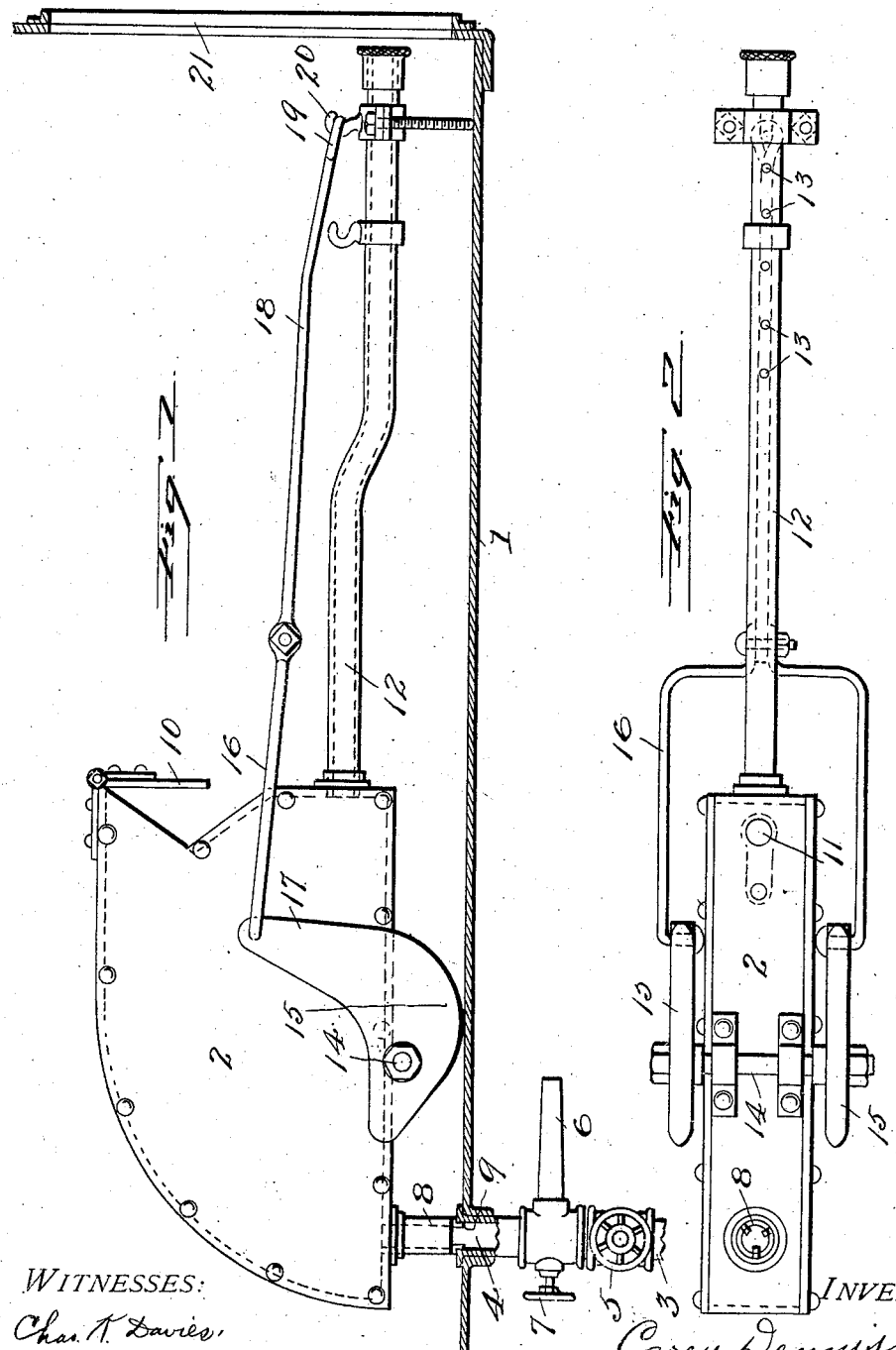

CAREY DENNIS, OF CARTHAGE, MISSOURI, ASSIGNOR OF ONE-FOURTH TO ASA HURST, OF CARTHAGE, MISSOURI.

BOILER-TRAP.

No. 850,878.　　　　Specification of Letters Patent.　　　Patented April 16, 1907.

Application filed August 23, 1906. Serial No. 331,770.

*To all whom it may concern:*

Be it known that I, CAREY DENNIS, a citizen of the United States, and a resident of Carthage, Missouri, (whose post-office address is Carthage, Missouri,) have invented a new and useful Boiler-Trap, of which the following is a specification.

My invention relates to an improved device for ridding boilers of sediment. Its advantages and characteristics are hereafter fully set forth in connection with a detailed description of the accompanying drawings, in which—

Figure 1 is a side view, partly in elevation and partly in section, of my improved trap in position in a boiler; and Fig. 2 a bottom view of the trap.

1 is a shell which typifies a boiler-shell or the casing of any fluid-container in connection with which my invention may be used; 2, the general designation of the trap; 3, an inlet-pipe communicating with the shell at 4 and having a valve 5; 6, a waste-pipe communicating with inlet-pipe 3 at 7 by means of a valve; 8, a pipe or nipple connected with the trap and having two or more prongs 9, adapted to fit within the inlet-pipe; 10, a check-valve, in the present instance an ordinary flap-valve, controlling an opening in the upper part of the trap communicating with the shell; 11, a second check-valve in the bottom of the trap opening inwardly; 12, a sediment-pipe communicating with the trap, usually near the bottom at one end and extending along rather near the bottom of the shell. This pipe is provided with a plurality of perforations 13, usually at or near the bottom; 14, a shaft secured to the under side of the trap; 15, rockers, one on each side of the trap on shaft 14; 16, linkage connected to arms 17 of the rockers and to a rod 18; 19, eye on rod 18; 20, a hook on sediment-pipe 12.

The operation is as follows: To admit water to the boiler or other receptacle, the waste-pipe is closed by the valve 7 and feed-valve 5 is opened. Water then passes into the trap through nipple 8 and out of the trap into the boiler through check-valve 10. Check-valve 11 in feeding is closed and no water passes therethrough. Sediment accumulates within the shell along the bottom. To clean the boiler, feed-valve 5 is closed and waste-valve 7 opened. Pressure within the boiler then forces the sediment through perforations 13 in the sediment-pipe and also through check-valve 11, which lifts under these conditions. The sediment passes through trap 2, nipple 8, and waste-pipe 6. In blowing off check-valve 10 automatically closes, preventing exit of water in the upper part of the boiler. The auxiliary check-valve 11 has been found of great importance, especially in long boilers, where the sediment-pipe does not adequately serve to carry off all the mud accumulated. The rockers 15 and related parts are employed to facilitate placing the trap within the shell and removing it therefrom without disturbing other parts of the apparatus. When the trap is placed in the boiler, rod 18 is pulled forward and eye 19 placed over hook 20 on the sediment-pipe. This thrusts the rockers 15 downward. The trap is then inserted within the shell through a manhole, such as 21, and rests on the bottom of the latter, the rockers in the position described serving to lift the trap considerably above the bottom of the boiler. The trap is then easily pushed back until nipple 8 is in proper place in relation to feed-pipe 4, whereupon the eye 19 is lifted off the hook 20, and the rockers are then free to move up and allow the trap to drop until prongs 9 on the nipple fit within the supply-pipe, and the connection to the trap is thus made without disturbing the permanent connections.

Obviously in removing the trap a reverse series of operations is performed. This feature is of great importance where the trap is employed in localities where the water carries a large amount of sediment, necessitating in many cases frequent removal of the trap from the boiler.

I contemplate any changes in detail in my invention which may be made within its spirit.

I claim—

1. A boiler-trap, comprising a hollow body adapted to rest on the bottom of a boiler or the like, a nipple communicating with the body and adapted to fit within the end of a feed-pipe connected with the boiler, and rockers carried by the body for raising and lowering the trap to facilitate its connection with the feed-pipe.

2. A boiler-trap comprising a body part, a sediment-pipe connected therewith and provided with perforations, a check-valve for discharging the water from the trap, an additional check-valve for admitting sediment to the trap, a feed-pipe, rockers movably connected with the trap, and means for moving the rockers so as to raise and lower the trap when in position in a boiler.

3. A boiler-trap comprising a body part, a sediment-pipe connected therewith and provided with perforations, a check-valve for discharging the water from the trap, an additional check-valve for admitting sediment to the trap, a feed-pipe, a shaft below the trap, a rocker on each end of the shaft, an operating-rod provided with an eye, a link connecting the rod and the rockers, and a hook on the sediment-pipe to engage the eye.

4. The combination of a shell, a feed-pipe, a cleaning-trap within the shell, a movable connection between the trap and the feed-pipe, and means for raising and lowering the trap.

In testimony whereof I have affixed my signature in the presence of two witnesses.

CAREY DENNIS.

Witnesses:
J. H. GUINN,
J. D. WEATHERS.